(12) United States Patent
Clessienne et al.

(10) Patent No.: US 8,705,469 B2
(45) Date of Patent: Apr. 22, 2014

(54) METHOD OF SENDING A DATA SIGNAL VIA A PLURALITY OF TRANSMITTER ENTITIES

(75) Inventors: Thierry Clessienne, Issy les Moulineaux (FR); Ali Osmane, Paris (FR)

(73) Assignee: Orange, Paris (FR)

( * ) Notice: Subject to any disclaimer, the term of this patent is extended or adjusted under 35 U.S.C. 154(b) by 128 days.

(21) Appl. No.: 13/140,875

(22) PCT Filed: Dec. 23, 2009

(86) PCT No.: PCT/FR2009/052674
§ 371 (c)(1),
(2), (4) Date: Jun. 20, 2011

(87) PCT Pub. No.: WO2010/072979
PCT Pub. Date: Jul. 1, 2010

(65) Prior Publication Data
US 2011/0255495 A1    Oct. 20, 2011

(30) Foreign Application Priority Data

Dec. 23, 2008    (FR) .................................... 08 59031

(51) Int. Cl.
*H04J 11/00*    (2006.01)
*H04W 4/00*    (2009.01)
*H04K 1/10*    (2006.01)

(52) U.S. Cl.
USPC ........... 370/329; 370/203; 370/208; 370/328; 375/260

(58) Field of Classification Search
USPC ........... 370/328–343, 203–210; 375/260–295
See application file for complete search history.

(56) References Cited

U.S. PATENT DOCUMENTS

| 7,460,607 | B2 * | 12/2008 | van Rooyen et al. | 375/265 |
| 7,508,880 | B2 * | 3/2009 | Yun et al. | 375/267 |
| 7,515,644 | B2 * | 4/2009 | Chae et al. | 375/267 |
| 7,733,970 | B2 * | 6/2010 | Yang | 375/260 |
| 7,751,307 | B2 * | 7/2010 | Muck et al. | 370/208 |
| 8,126,066 | B2 * | 2/2012 | Osseiran et al. | 375/260 |
| 2004/0008616 | A1 * | 1/2004 | Jung et al. | 370/203 |
| 2005/0265280 | A1 * | 12/2005 | Roh et al. | 370/328 |
| 2005/0286462 | A1 * | 12/2005 | Roh et al. | 370/328 |
| 2006/0077886 | A1 * | 4/2006 | Oh et al. | 370/208 |
| 2006/0203711 | A1 * | 9/2006 | Oh et al. | 370/208 |
| 2008/0260053 | A1 * | 10/2008 | Yun et al. | 375/260 |

FOREIGN PATENT DOCUMENTS

EP        1 628 425 A2    2/2006

* cited by examiner

*Primary Examiner* — Man Phan
(74) *Attorney, Agent, or Firm* — Drinker Biddle & Reath LLP (57) ABSTRACT

A method of sending a data signal having a series of symbols to a receiver includes generating multiple OFDM signals, which are transmitted by multiple transmitter entities. A succession of pairs of symbols is also generated. The method may also include generating at least one pair of symbols orthogonal to a current pair of symbols of the succession of pairs of symbols, generating at least one duplicated pair of symbols by duplicating the current pair of symbols, and allocating at least one current pair of symbols, at least one orthogonal pair of symbols, and at least one duplicated pair of symbols to the transmitter entities of the plurality of transmitter entities. Generating at least one orthogonal pair, generating a duplicated pair, and the allocating step may be repeated for all the pairs of symbols of the series of symbols.

5 Claims, 4 Drawing Sheets

METHOD OF SENDING A DATA SIGNAL VIA A PLURALITY OF TRANSMITTER ENTITIES

CROSS-REFERENCE TO RELATED APPLICATIONS

This application is the U.S. national phase of the International Patent Application No. PCT/FR2009/052674 filed Dec. 23, 2009, which claims the benefit of French Application No. 08 59031 filed Dec. 23, 2008, the entire content of which is incorporated herein by reference.

FIELD

The field of the invention is that of telecommunications. The invention relates more particularly to sending a data signal from a plurality of transmitter entities to at least one receiver.

BACKGROUND

A signal sent by a transmitter entity suffers distortion as a function of propagation conditions and in particular the power of the signal received by a receiver varies in time and in space. In a radio telecommunications network, a transmitter entity is for example a radio transmitter including a transmitter antenna, a radio base station, or a fixed or mobile radio relay station including a device for sending a signal coming from a radio base station. A transmitter entity may equally be a transmitter of signals by acoustic means in an undersea medium or a transmitter for a fixed telecommunications network, for example an optical fiber network or a copper network.

In order to improve the quality of the signal received by a receiver, replicas of the signal may also be transmitted to the receiver. Temporal diversity is obtained in this way by transmitting the signal and replicas with a time shift, spatial diversity is obtained by transmitting the signal and replicas via different antennas, and frequency diversity is obtained by transmitting the signal and replicas on different frequencies.

The spatial and temporal diversity properties are thus exploited in MISO (multiple input single output) telecommunications networks in which different replicas of the signal are transmitted by colocated transmitter entities.

The replicas of the signal are generated by applying a space-time code to the temporal signal to be sent consisting of a succession of symbols. The space-time code is selected as a function of the properties of temporal orthogonality between the signal and the replicas obtained after space-time coding. The selection of the code depends in particular on the number of transmitter entities. With two colocated transmitter entities, it is routine to use an Alamouti code as described in the document "A simple transmit diversity technique for wireless communications" by S. M. Alamouti published in IEEE Journal on Select Areas in Communications, vol. 16, 1998. The replica of the signal obtained after applying the Alamouti code consists of a succession of symbols orthogonal to the succession of symbols before coding.

Using these space-time codes thus makes it possible to exploit the spatial and temporal diversities obtained by transmitting from the same location the signal and one or more orthogonal replicas of the signal, the signal and the replicas suffering similar distortion between the various transmitter entities and the receiver, and notably suffering identical attenuation of their power and being subject to the same propagation delay.

However, for distributed MISO telecommunications networks in which the various replicas are transmitted by different and geographically remote transmitter entities, the properties of temporal orthogonality between the signals and the replicas are no longer respected at the receiver level. The propagation conditions between each transmitter entity and the receiver are different, notably the propagation time to which the signal and the replicas are subjected. Thus the signal and the replicas are subjected to different time shifts that may prove impossible to compensate on transmission and the properties of orthogonality between the signal and the replicas are no longer respected at the receiver level. Space-time decoding in the receiver is then no longer possible.

The document "System Performance of Distributed Transmit Diversity of OFDL-based 1xEV-DO Broadcast Network" by Young C. Yoon, Alpaslan Savas, and Wanshi Chen, published in the proceedings of the Wireless Communications and Networking Conference, IEEE-WCNC 2006, vol. 3, pages 1475-1479, applies the principle of the orthogonality of the Alamouti code in the frequency domain to a distributed MISO-type network. Thus an OFDM (orthogonal frequency division multiplex) signal and an orthogonal replica of the signal in the frequency domain generated by applying an Alamouti code to the succession of symbols to be sent are transmitted to a receiver by two geographically-remote transmission entities. Any time shift being reflected in a phase-shift in the frequency domain, a time shift between a signal and its replica therefore no longer affects Alamouti decoding in the receiver, by means of the frequency processing carried out to constitute the OFDM signals on transmission and ODFM demodulation on reception. However, this is possible only for a distributed MISO network sending a signal and a single replica to a receiver from two geographically-remote transmitter entities. This restriction prevents deployment of distributed MISO telecommunications networks sending a signal by a plurality of transmitter entities, for example in so-called collaborative telecommunications networks.

SUMMARY

There is therefore a need for a method of transmitting a data signal to at least one receiver from a plurality of transmitter entities, whether those transmitter entities are colocated and/or situated at geographically distinct points.

To achieve this objective, the invention provides a method of sending a data signal comprising a series of symbols to a receiver, the method including generating a plurality of OFDM signals respectively transmitted by a plurality of transmitter entities. The method includes the steps of:
  generating a plurality of a succession of pairs of symbols from the series of symbols, including the substeps of:
    generating at least one pair of symbols orthogonal to a current pair of symbols of said succession of pairs of symbols;
    generating at least one replica by duplicating the current pair of symbols; and
    allocating said current pair of symbols of said at least one orthogonal pair of symbols and said at least one replica to the transmitter entities of the plurality of transmitter entities,
  the substeps being repeated for all the pairs of symbols of the succession of pairs of symbols;
  generating the plurality of OFDM signals from the plurality of a succession of pairs of symbols, the OFDM signals including a plurality of sub-carriers equal to twice the number of transmitter entities.

Thus a gain in spatial diversity and a gain in temporal diversity are obtained by a combination of properties of orthogonality and colinearity of signals transmitted by a plurality of transmission entities that may equally well be colocated or situated at geographically distinct points. The iterative allocation of the pairs of symbols to be sent, orthogonal pairs of symbols or duplicated pairs of symbols, moreover makes it possible to distribute the harmful effects that a particular propagation channel might induce between a transmitter entity and the receiver. Moreover, the receiver is likely to receive signals transmitted by geographically-remote entities enabling the setting up of telecommunications networks combining colocated transmitter entities and geographically-remote transmitter entities.

The at least one orthogonal pair of symbols is generated by applying space-time coding to the current pair of symbols.

This makes it possible to ensure the property of orthogonality simply by applying code words to the pairs of symbols.

In one particular implementation of the invention the pair of symbols to be sent, the at least one orthogonal pair of symbols, and the at least one duplicated pair of symbols are allocated cyclically to the plurality of transmitter entities.

Cyclic allocation of pairs of symbols to be sent, of orthogonal pairs of symbols and of duplicated pairs of symbols makes it possible to average out the harmful effects that a particular propagation channel may induce between a transmitter entity and the receiver. Cyclic allocation requires no propagation channel quality information. No consumption of additional spectral resources is necessary for the receiver to transmit this type of information. This allocation is for example appropriate for broadcasting data.

In one particular implementation, the step of generating a plurality of a succession of pairs further includes the substeps of:
collecting a set of quality indices of propagation channels between the transmitter entities and the receiver;
selecting the current pair of symbols, the at least one orthogonal pair of symbols, and the at least one duplicated pair of symbols allocated to the plurality of transmitter entities according to said set of quality indices.

Thus collecting the quality indices of the various propagation channels makes it possible to reinforce the orthogonal or colinear component, i.e. to give preference to the temporal diversity or spatial diversity gain and thus to maximize the overall diversity gain obtained.

The invention also provides devices in various embodiments of the invention.

In a first embodiment of the invention, a device intended for a transmitter entity generates and transmits an OFDM signal from the sequence of symbols to be transmitted via a plurality of transmitter entities.

In a second embodiment of the invention, the steps of the method are executed by a management entity and the transmitter entities are connected to the management entity. A device intended for a management entity generates and allocates cyclically to the transmitter entities pairs of symbols to be sent, orthogonal pairs of symbols and duplicated pairs of symbols. A transmitter entity is able to transmit an OFDM signal from a succession of input symbols.

In a third embodiment of the invention, the steps of the method are executed by a management entity and the transmitter entities are connected to the management entity. A device intended for a management entity generates and selectively allocates to the transmitter entities pairs of symbols to be transmitted, orthogonal pairs of symbols and duplicated pairs of symbols. A transmitter entity is able to transmit an OFDM signal from a succession of input symbols.

In a fourth embodiment of the invention, a device intended for a management entity notifies selective allocation of pairs of symbols to be sent, orthogonal pairs of symbols and duplicated pairs of symbols, the selection being determined on the basis of collected quality indices of propagation channels between the transmitter entities and the receiver. Following reception of notification of selection, a device intended for a transmitter entity, generates a succession of pairs to be transmitted, duplicated and orthogonal pairs, and transmits an OFDM signal.

Devices of the invention have advantages similar to those of the method described above.

The invention also provides a management entity including one of the above devices.

The invention also provides a system including transmission entities including a device as described above for generating and transmitting an OFDM signal from the succession of the series of symbols to be sent via a plurality of transmitter entities.

The invention also provides a system including a management entity including a device as described above for generating and selectively allocating to the transmitter entities pairs of symbols to be transmitted, orthogonal pairs of symbols and duplicated pairs of symbols.

The invention also provides a system including a management entity including a device as described above including notification of selective allocation of orthogonal and duplicated pairs of symbols to the transmitter entities, the transmitter entities connected to the management entity including a device as described above for generating an OFDM signal following reception of the notification.

The invention also provides a computer program for a management entity including software instructions for controlling execution of those steps of the method that are executed by a management entity when the program is executed by the management entity.

The invention also provides a computer program for a transmitter entity including software instructions for controlling execution of those of the steps of the method that are executed by a transmitter entity when the program is executed by the transmitter entity.

BRIEF DESCRIPTION OF THE DRAWINGS

Other features and advantages of the present invention become more clearly apparent on reading the following description of several particular implementations of the method, in which description.

DETAILED DESCRIPTION

In order to clarify the definitions, the following paragraphs serve as a reminder of the principle of colocated transmitter entities in an MISO telecommunications network sending a signal and orthogonal replicas.

The orthogonal replicas are generated by applying a space-time code to the series of symbols to be sent. A space-time code makes it possible to exploit the spatial and temporal diversities obtained by transmitting a signal and orthogonal replicas.

With two colocated transmitter entities, it is usual to employ the Alamouti code. A series $S_{ortho}$ of symbols is thus generated from the series of symbols to be sent $S=\{s_0, s_1, S_2, s_3, \ldots s_{2k}, s_{2k+1}, \ldots\}$ such that $$S_{ortho} = \{-s_1^*, s_0^*, -s_3^*, s_2^* \ldots -s_{2k+1}^*, s_{2k}^*, \ldots\},$$

where * designates the complex conjugate.

In an equivalent manner, the series $S_{ortho}$ of symbols is generated by "applying" a matrix code word $C_{Alamouti}$ to successive pairs from the series S of symbols to be sent:

$$C_{Alamouti} = \begin{pmatrix} s_0 & s_1 \\ -s_1^* & s_0^* \end{pmatrix}$$

A first succession of pairs of symbols is obtained by reading the first row of the matrix code word and is transmitted by a first transmitter entity. The corresponding series of symbols is identical to the series S of symbols to be sent.

A second succession of pairs of symbols is obtained by reading the second row of the matrix code word and is transmitted by a second transmitter entity. The corresponding series of symbols is the series $S_{ortho}$ of symbols orthogonal to the series S of symbols to be sent.

The property of orthogonality between the signal transmitted and its replica is expressed by the property of the code word that is such that:

$$C_{Alamouti} C_{Alamouti}^\dagger = (\|s_0\|^2 + \|s_1\|^2) Id_2$$

where † designates the conjugate transpose and the matrix $Id_2$ is the identity matrix of size (2,2).

The Alamouti code makes it possible to render orthogonal on the time axis and on the space axis a propagation channel $H_1$ between the first transmitter entity and the receiver and a propagation channel $H_2$ between the second transmitter entity and the receiver.

The receiver returns an estimate $S_{estim}$ of the series of symbols that was transmitted by applying Alamouti decoding in the maximum likelihood sense to a series $S_{recu}$ of received symbols resulting from the transmission of the series S and $S_{ortho}$ of symbols from the first and second transmitter entities, respectively. Decoding is effected by estimating the propagation channels $H_1$ and $H_2$ and successively estimating pairs of symbols that have been transmitted by solving the system:

$$S_{estim} = H_{equi}^\dagger \times S_{recu} \text{ where}$$

$$H_{equi} = \begin{pmatrix} H_1 & -H_2 \\ H_2^* & H_1^* \end{pmatrix}$$

which system takes the following equivalent form by virtue of the orthogonality property of the code:

$$\begin{pmatrix} Sestim_0 \\ Sestim_1^* \end{pmatrix} = \begin{pmatrix} \|H_1\|^2 + \|H_2\|^2 & 0 \\ 0 & \|H_1\|^2 + \|H_2\|^2 \end{pmatrix} \times \begin{pmatrix} s_0 \\ s_1^* \end{pmatrix} + N$$

where N is a received noise component vector.

With geographically remote transmitter entities, the orthogonality property is preserved in the particular circumstance of two transmitter entities and for OFDM signals as covered in the above-mentioned paper by Young, C. Yoon, Alpaslan, and Wanshi, and the receiving principle is similar.

We now turn to a number NE of transmitter entities that may equally well be colocated or geographically remote from one another.

Figure 1:
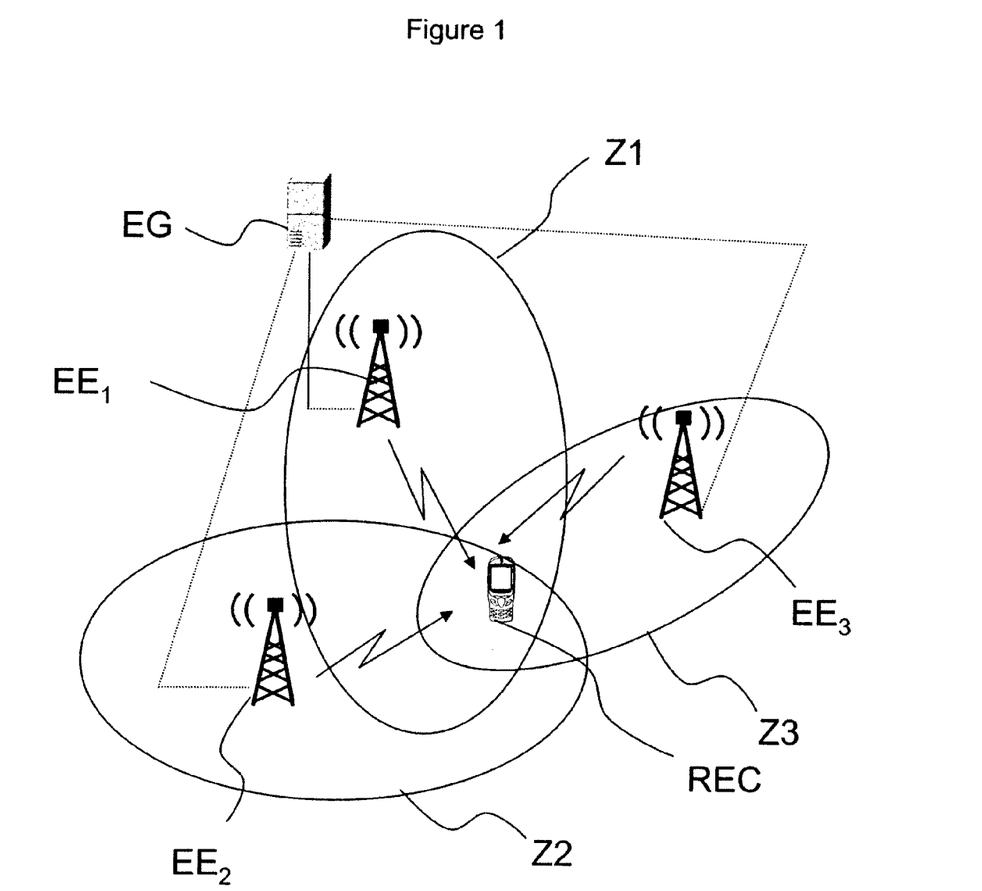
FIG. 1 shows an example of a distributed MISO telecommunications network architecture.

FIG. 1 shows an example of a distributed MISO telecommunications network architecture for sending a data signal from transmitter entities $EE_2$, $EE_2$, $EE_2$ to a receiver REC.

By way of illustrative example, the transmitter entities are radio base stations or fixed or mobile radio relay stations. The transmitter entities are connected to a management entity EG of a telecommunications network that is not shown. The telecommunications network is for example a UMTS (Universal Mobile Telecommunications system) mobile radio telecommunications network of a generation subsequent to the third generation, such as the LTE (Long Term Evolution) generation, or a radio local area network such as a WIMAX (Worldwide Interoperability for Microwave Access) network. It may also be a mobile radio telecommunications network of the collaborative network type.

The receiver is a mobile terminal for example or any equipment including a communications module able to receive radio signals from transmitter entities.

In this example the transmitter entities are at geographically distinct points and each of them covers a respective radio coverage area Z1, Z2, Z3.

This architecture may be transposed to the field of undersea telecommunications networks, the coverage areas then being defined as a function of the ranges of the undersea acoustic waves. Similarly, with fixed networks, the coverage areas are defined by the cabling of the various transmitter entities.

In such an architecture, a data signal comprising a series of symbols is sent to the receiver REC by the various entities in order to improve the quality of the received signal.

Figure 2:
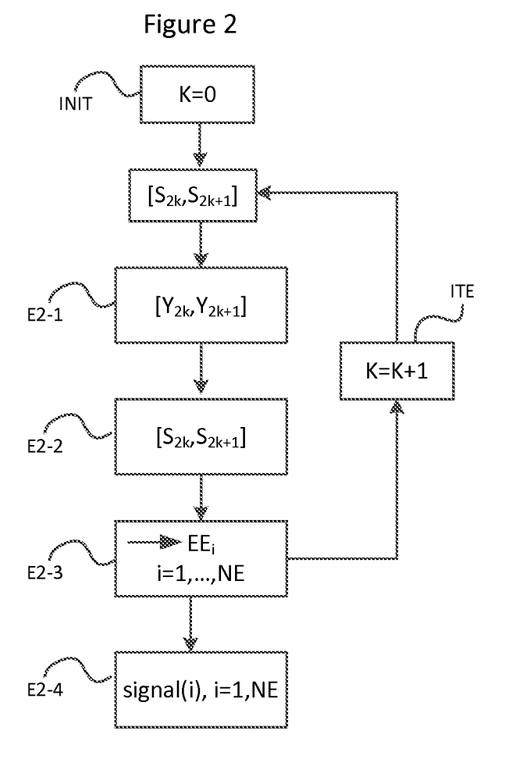
FIG. 2 shows the steps of the method of the invention for sending a signal to a receiver by transmitter entities.

FIG. 2 shows the steps of the method of sending a data signal comprising a series of symbols by transmitter entities that may equally well be colocated and/or geographically remote from one another. The steps of the method are described for sending a data signal by NE transmitter entities $EE_i$ for i varying from 1 to NE and for NE greater than 1. For clarity, the steps are explained more specifically for the particular configuration of three transmitter entities $EE_1$, $EE_2$, $EE_3$.

The data signal comprises a series S of N symbols $s_n$, the index n varying from 0 to N−1. The symbols are for example modulated symbols such as PSK (phase shift keying) symbols or QAM (quadrature amplitude modulation) symbols. The symbols of the series S are considered as successive symbol pairs such that a $k^{th}$ pair corresponds to the successive symbols $s_{2k}$, $s_{2k+1}$.

The method comprises steps E2-1 to E2-3 applied iteratively to the succession of symbol pairs. The iterations are symbolized by a step INIT of initializing an index k on the symbols to be sent and a step ITE of incrementing the index k.

In a step E2-1, at least one pair of symbols $[y_{2k}, y_{2k+1}]$ orthogonal to the current pair of symbols $[s_{2k}, s_{2k+1}]$ is generated. An orthogonal pair of symbols is obtained for example by applying a space-time code such as an Alamouti code.

The various steps illustrated below apply an Alamouti code, but may be transposed to any code suitable for generating a pair of symbols orthogonal to the current pair of symbols. An orthogonal pair of symbols generated from the Alamouti code as described above is given by:

$$[y_{2k}, y_{2k+1}] = [-s^*_{2k+1}, s^*_{2k}]$$

where designates the complex conjugate.

The number of orthogonal pairs of symbols is equal to $N_{ortho}$.

In a step E2-2 at least one duplicated pair of symbols, which is called a replica, is generated from the current pair of symbols $[s_{2k}, s_{2k+1}]$.

The number of duplicated pairs of symbols generated is equal to $N_{duplic}$.

The total number of pairs of symbols generated during steps E2-1 and E2-2 is such that:

$$N_{ortho} + N_{duplic} + 1 = NE,$$

the numbers $N_{ortho}$ and $N_{duplic}$ being configurable.

Thus, with three transmitter entities, one duplicated pair of symbols $[s_{2k}, s_{2k+1}]$ is generated, for example.

In a step E2-3, the orthogonal pairs of symbols and the duplicated pairs of symbols generated during the steps E2-1 and E2-2, respectively, and the current pair of symbols, are allocated to the various transmitter entities. In one particular implementation of the invention, the current pair of symbols, the orthogonal pairs of symbols, and the duplicated pairs of symbols are allocated cyclically to the various transmitter entities.

Thus, with three transmitter entities, the pair of symbols orthogonal to the current pair of symbols is for example allocated to the transmitter unit $EE_1$ if the two orthogonal pairs generated during the preceding two iterations have been allocated to the transmitter entities $EE_2$ then $EE_3$, respectively.

Thus, for example, on the $k^{th}$ iteration, the succession $SC\_EE_1(k)$ of all the pairs allocated iteratively to the entity $EE_1$ is given by:

$$SC\_EE_1(k) = \{[y_0, y_1], [s_2, s_3], [s_4, s_5], [y_6, y_7] \ldots [s_{2k-4}, s_{2k-3}], [s_{2k-2}, s_{2k-1}]\}$$

and the successions $SC\_EE_2(k)$ and $SC\_EE_3(k)$ of pairs allocated to the entities $EE_2$ and $EE_3$ are respectively:

$$SC\_EE_2(k) = \{[s_0, s_1], [y_2, y_3], [s_4, s_5], [s_6, s_7] \ldots [y_{2k-4}, y_{2k-3}], [s_{2k-2}, s_{2k-1}]\}$$

$$SC\_EE_3(k) = \{[s_0, s_1], [s_2, s_3], [y_4, y_5], [s_6, s_7] \ldots [s_{2k-4}, s_{2k-3}], [y_{2k-2}, y_{2k-1}]\}.$$

In this particular example, an allocation cycle corresponds to iteratively allocating three successive orthogonal pairs to the three transmitter entities. As a general rule the allocation cycle is configurable.

Alternatively, the allocation of the pairs of symbols made during the step E2-3 is selective. The step E2-3 then includes substeps E2-31 and E2-32 shown in FIG. 3.

Figure 3:
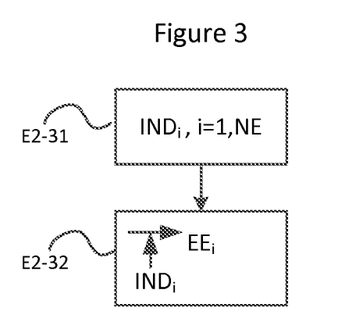
FIG. 3 shows substeps of allocating pairs of symbols to the transmitter entities in one particular implementation of the invention.

During the substep E2-31, allocation is effected from a collection of a set of quality indices for the propagation channel between each transmitter entity EEi and the receiver, each index being written $IND_i$ for i varying from 1 to NE.

By way of example, this collection is performed by receiving quality indices for the propagation channels transmitted by the receiver. These indices are power measurements or received signal attenuation estimates, for example. These measurements or estimates are effected by the receiver on the basis of received signals or of pilot signals transmitted by the various transmitter entities, for example.

During the substep E2-32, the orthogonal pairs of symbols are allocated to the transmitter entities as a function of the values of the set of collected quality indices.

In one particular implementation of the invention, pairs of symbols orthogonal to the current pair of symbols are allocated to a set of transmitter entities having corresponding quality index values from the set of collected quality indices that are maximum values. This makes it possible to reinforce the sending of an orthogonal pair of symbols and thus to give preference to a spatial diversity gain.

Alternatively, pairs of symbols orthogonal to the current pair of symbols are allocated to a set of transmitter entities having corresponding quality indices from the set of quality indices collected that are minimum values. This makes it possible to reinforce the sending of the current pair of symbols and the duplicated pair of symbols and thus to give preference to a temporal diversity gain.

Alternatively, the orthogonal pairs of symbols are allocated as a function of a selection criterion satisfying a compromise between spatial diversity and temporal diversity. By way of non-limiting and illustrative example, two sets of transmitter entities are defined corresponding to the allocation of an orthogonal pair of symbols to the transmitter entities of the first set and a duplicated pair of symbols to the transmitter entities of the second set, so that the mean of the quality indices corresponding to the first set is comparable to the mean of the quality indices corresponding to the second set. This selection criterion makes it possible to equalize the total reception qualities on the orthogonal and colinear components.

Three successions $SCS\_EE_1(k)$, $SCS\_EE_2(k)$, and $SCS\_EE_3(k)$ of symbols are generated in this way when there are three transmitter entities $EE_1$, $EE_2$, $EE_3$.

During a step E2-4, NE OFDM signals, signal(i) for i varying from 1 to NE, including a number $N_f$ of sub-carriers, are generated from, respectively, the NE successions of symbols iteratively allocated to the NE transmitter entities during steps E2-1 to E2-3. To this end, OFDM transmitters that are well known to the person skilled in the art are used in the NE transmitter entities.

The receiver then receives NE OFDM signals from NE transmitter entities that may equally well be colocated or geographically remote and uses an OFDM demodulator before effecting Alamouti decoding in accordance with the principle referred to above for an MISO system with colocated transmitter entities.

Figure 4:
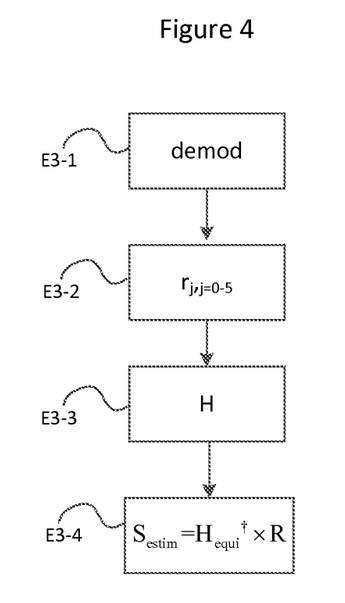
FIG. 4 shows steps of one example of a method of the invention for receiving a signal sent by transmitter entities.

An example of a method of receiving the NE OFDM signals is described with reference to FIG. 4. For clarity, the steps of the method are explained in the particular circumstance of three transmitter entities and a cyclic allocation of the current pair of symbols, one orthogonal pair of symbols, and one duplicated pair of symbols. For clarity and simplicity, in this particular implementation the number Nf of sub-carriers of an OFDM signal transmitted by the transmitter entity EEi is twice the number NE of transmitter entities. Thus with three transmitter entities, each of the three OFDM signals includes six sub-carriers.

The cyclic allocation of current, orthogonal, and duplicated pairs of symbols may be expressed in equivalent fashion by applying a coding matrix to the series $S=\{s_0, s_1, s_2, s_3, \ldots s_{2k}, s_{2k+1}, \ldots\}$ of symbols to be sent such that the obtained code word C is:

$$C = \begin{pmatrix} s_0 & s_1 & s_2 & s_3 & -s_5^* & s_4^* \\ s_0 & s_1 & -s_3^* & s_2^* & s_4 & s_5 \\ -s_1^* & s_0^* & s_2 & s_3 & s_4 & s_5 \end{pmatrix}$$

The transmitter entity $EE_1$ transmits the series of symbols corresponding to the first row of the code word, the communicating entity $EE_2$ transmits the series of symbols corresponding to the second row of the code, and the entity $EE_3$ transmits the succession of symbols corresponding to the third row of the code. In this example the pair orthogonal to the pair $[s_0,s_1]$ is allocated to the transmitter entity $EE_3$, the pair orthogonal to the next pair $[s_2,s_3]$ is allocated to the transmitter entity $EE_2$, and the pair orthogonal to the pair $[s_4,s_5]$ is allocated to the transmitter entity $EE_1$.

The six columns of the code word C respectively correspond to the six sub-carriers of the OFDM signals transmitted by each transmitter entity. Thus, the first sub-carrier is modulated by the symbol $s_0$ at the transmitter entity $EE_1$, by the symbol $s_0$ at the transmitter entity $EE_2$, and by the symbol $-s_1^*$ at the transmitter entity $EE_3$.

The code word is then repeated for all cycles of allocating three pairs of successive symbols.

In the step E3-1, the overall received OFDM signal, corresponding to the transmission of the three OFDM signals, each comprising six sub-carriers and transmitted by respective transmitter entities, is demod by an OFDM demodulator, for example by applying a Fourier transform.

Steps E3-2 to E3-4 are repeated for groups of three pairs of successive symbols in order to restore the series of symbols of the data signal. For clarity regarding the indices, this iteration is described for the first group of three pairs.

In the step E3-2, the demodulator restores a set of six received symbols $r_j$, j=0 to 5 corresponding to the transmission of three pairs by respectively the three transmitter entities. In an equivalent fashion, the received symbols are expressed as follows:

$$R = HC + N$$

where:

$$R = \begin{pmatrix} r_0 \\ r_1 \\ r_2 \\ r_3 \\ r_4 \\ r_5 \end{pmatrix} N = \begin{pmatrix} n_0 \\ n_1 \\ n_2 \\ n_3 \\ n_4 \\ n_5 \end{pmatrix}$$

and $H = \begin{pmatrix} H_1(f_1) & H_1(f_2) & H_1(f_3) & H_1(f_4) & H_1(f_5) & H_1(f_6) \\ H_2(f_1) & H_2(f_2) & H_2(f_3) & H_2(f_4) & H_2(f_5) & H_2(f_6) \\ H_3(f_1) & H_3(f_2) & H_3(f_3) & H_3(f_4) & H_3(f_5) & H_3(f_6) \end{pmatrix}$ It can also be written:

$$R(f_k) = \sum_{i=1}^{3} H_i(f_k) C[i,k] + n(f_k)$$

where:
$H_1(f_k)$ is the frequency propagation channel at frequency $f_k$ between the terminal and the base station1,
$C[i,k]$ is the matrix C element at line i and column k,
$n(f_k)$ is the noise at frequency $f_k$.

The components of the vector N represent the noise components affecting the signals received on each sub-carrier. A component $H_i(f_1)$ of the matrix H corresponds to the propagation channel impacting on the symbol conveyed by the sub-carrier $f_1$ of the OFDM signal signal(i) transmitted by the transmitter entity $EE_L$, for l varying from 1 to 6 and i varying from 1 to 3.

The resulting properties of orthogonality and co-linearity between the various pairs of symbols transmitted by the transmitter entities make it possible to express the received symbols in the following equivalent form:

$$R = H_{equi} \times S_d + N$$

where:

$$H_{equi} = \begin{pmatrix} H_1(f_1)+H_2(f_1) & -H_3(f_1) & 0 & 0 & 0 & 0 \\ H_3^*(f_2)) & [H_1(f_2)+H_2(f_2)]^* & 0 & 0 & 0 & 0 \\ 0 & 0 & H_1(f_3)+H_3(f_3) & -H_2(f_3) & 0 & 0 \\ 0 & 0 & H_2^*(f_4) & [H_1(f_4)+H_3(f_4)] & 0 & 0 \\ 0 & 0 & 0 & 0 & H_2(f_5)+H_3(f_5) & -H_1(f_5) \\ 0 & 0 & 0 & 0 & H_1^*(f_6) & [H_2(f_6)+H_3(f_6)]^* \end{pmatrix}$$

and $S_d = \begin{pmatrix} s_0 \\ s_1^* \\ s_2 \\ s_3^* \\ s_4 \\ s_5^* \end{pmatrix}$ Since the matrix $H_{equi}$ is an orthogonal matrix, an estimate of the symbols that were transmitted is obtained by decoding in the maximum likelihood sense, starting with the estimate of H.

Accordingly, in a step E3-3, a channel estimator determines the matrix H from the received overall OFDM signal, for example by any estimation method in the maximum likelihood sense based on transmission of pilots by the transmitter entities, or by a blind estimation method requiring no pilots.

In a step E3-4, a symbol estimator determines a vector $S_{estim}$ including the estimates of the six successive symbols $s_0$, $s_1$, $s_2$, $s_3$, $s_4$, $s_5$ that have been sent, for example by multiplying the received vector R by the conjugate transpose matrix $H_{equi}^\dagger$ for the matrix $H_{equi}$:

$$S_{estim} = H_{equi}^\dagger \times R$$

that is also given by:

$$S_{estim} = Id_6 \times DIV \times S + N,$$

where the matrix $Id_6$ is the identity matrix of size 6×6 and the matrix DIV is:

$$DIV = \begin{pmatrix} \|H_1(f_1) + H_2(f_1)\|^2 + \|H_3(f_1)\|^2 \\ \|H_1(f_2) + H_2(f_2)\|^2 + \|H_3(f_2)\|^2 \\ \|H_1(f_3) + H_3(f_3)\|^2 + \|H_2(f_3)\|^2 \\ \|H_1(f_4) + H_3(f_4)\|^2 + \|H_2(f_4)\|^2 \\ \|H_2(f_5) + H_3(f_5)\|^2 + \|H_1(f_5)\|^2 \\ \|H_2(f_6) + H_3(f_6)\|^2 + \|H_1(f_6)\|^2 \end{pmatrix}$$

It should be noted that each row of the matrix DIV includes a temporal diversity gain term obtained by transmitting the current pair of symbols and its replica, to which is added a spatial diversity gain term obtained by transmitting an orthogonal pair of symbols.

For a number NE of transmitter entities, the demodulator demodulates Nf sub-carriers and in an equivalent fashion the steps E3-2 to E3-4 are executed for a matrix H of size (NE, Nf).

When simultaneously allocating a plurality of orthogonal pairs to a plurality of transmitter entities, a row of the matrix DIV includes in the same way a temporal diversity gain term given by a first summation corresponding to the transmission of the current pair and its replica, to which is added a spatial diversity gain term given by a second summation corresponding to the transmission of the orthogonal pairs.

It should be noted that the mode of selecting orthogonal, current, and duplicated pairs of symbols allocated to the transmitter entities, i.e. cyclic or selective allocation, has no impact on the receiver, for which the only parameter that is to be taken into consideration is the number of transmitter entities that determines the number of sub-carriers of the OFDM signals.

The receiver is adapted to receive a plurality of OFDM signals generated in accordance with the invention and transmitted equally well by colocated or geographically remote transmitter entities.

To increase the data rate of the sent data signal, the series of symbols may additionally be divided beforehand into a number M of sub-series of symbols. The sub-series are transmitted in parallel by the transmitter entities of the invention. Each of these NE ODFM signals includes a subset of Nf sub-carriers that are specific thereto and taken from a set of Nf×M sub-carriers.

Methods of the invention for sending a data signal comprising a series of symbols from a plurality of transmitter entities that may equally well be colocated and/or geographically remote are described below.

Figure 5:
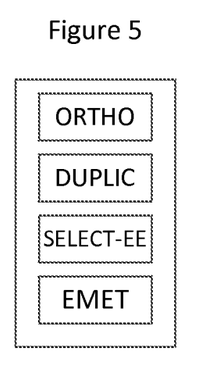
FIG. 5 shows diagrammatically a device for sending an OFDM signal from a transmitter entity in a first implementation of the invention, the OFDM signal being determined from a series of symbols to be sent to a receiver by a plurality of transmitter entities.

In a first implementation of the invention, the transmitter entities are adapted to determine an OFDM signal from a series of symbols to be sent processed in successive pairs, which OFDM signal comprises a plurality of sub-carriers equal to twice the number of transmitter entities. In this implementation of the invention, the means for performing the invention are integrated into the transmitter entities.

FIG. 5 is a diagrammatic view of a device for sending an OFDM signal of a transmitter entity of this first implementation of the invention.

FIG. 5 shows only the means for performing the invention. The transmitter entity includes:
  means ORTHO for generating pairs of symbols orthogonal to a pair of symbols to be sent;
  means DUPLIC for generating duplicated pairs of symbols from a pair of symbols to be sent;
  means SELECT-EE for cyclically selecting a pair of symbols from the current, orthogonal and duplicated pairs of symbols; the means SELECT-EE may in equivalent fashion be means for cyclically activating the generator means ORTHO or DUPLIC; and
  means EMET for transmitting an OFDM signal on a plurality of sub-carriers equal to twice the number of transmitter entities, starting from a succession of pairs of symbols delivered by the means SELECT-EE.

Figure 6:
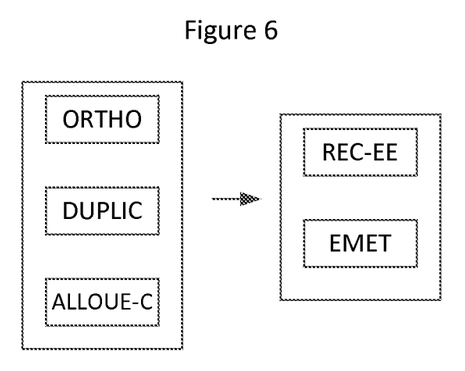
FIG. 6 shows diagrammatically a device of a management entity for generating a plurality of a succession of pairs of symbols and a device for sending an OFDM signal from a transmitter entity connected to the management entity in a second implementation of the invention.

In a second implementation of the invention the steps of the method are performed by a management entity of the telecommunications network and the transmitter entities connected to the management entity. The management entity is for example a base station controller of a mobile radio telecommunications network. In this implementation of the invention, a management entity includes means for generating and cyclically allocating current, orthogonal and duplicated pairs of symbols to the transmitter entities. A transmitter entity includes means for transmitting an OFDM signal starting from a succession of received symbols.

FIG. 6 is a diagrammatic view of a device of a management entity for generating a plurality of a succession of pairs of symbols and a device for sending an OFDM signal from a transmitter entity connected to the management entity in this second implementation of the invention. As before, the OFDM signal is determined from a series of symbols to be sent to a receiver by a plurality of transmitter entities.

FIG. 6 shows only the means of the management unit and a transmitter unit for performing the invention.

The management entity includes:
means ORTHO for generating pairs of symbols orthogonal to a pair of symbols to be sent;
means DUPLIC for generating duplicated pairs of symbols from a pair of symbols to be sent;
means ALLOUE-C for cyclically allocating to the plurality of transmitter entities pairs of symbols to be sent (current pairs), orthogonal and duplicated pairs of symbols delivered by the generator means ORTHO and DUPLIC, respectively.

The transmitter entity includes:
means REC-EE for receiving a succession of pairs of symbols from the management entity;
means EMET for transmitting an OFDM signal on a plurality of sub-carriers equal to twice the number of transmitter entities, starting from a succession of pairs of symbols received by the means REC-EE.

Figure 7:
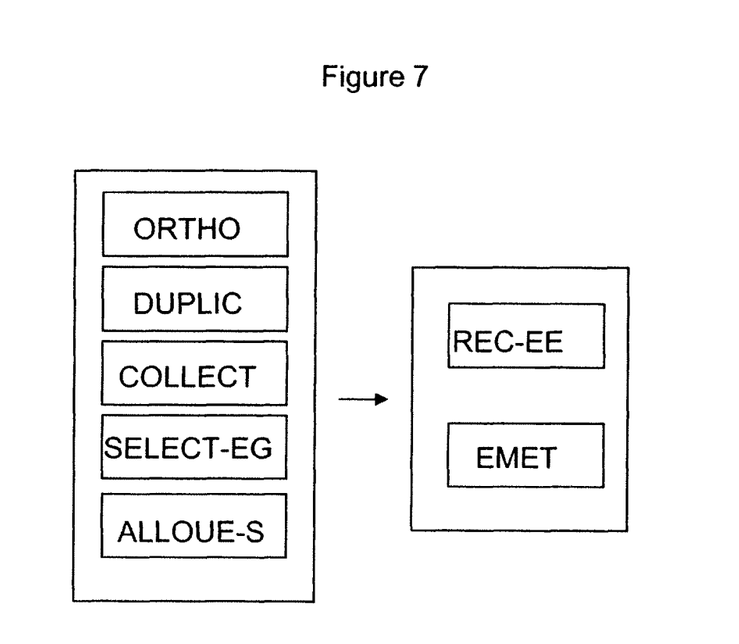
FIG. 7 shows diagrammatically a device of a management entity for generating a plurality of a succession of pairs of symbols and a device for sending an OFDM signal from a transmitter entity connected to the management entity in a third implementation of the invention.

In a third implementation of the invention, the steps of the method are performed by a management entity of the telecommunications network and the transmitter entities connected to the management entity. The management entity is for example a base station controller of a mobile radio telecommunications network. In this implementation of the invention, a management entity includes means for generating and selectively allocating orthogonal and duplicated pairs of symbols to the transmitter entities. A transmitter entity includes means for transmitting an OFDM signal starting from a succession of received symbols.

FIG. 7 is a diagrammatic view of a device of a management entity for generating a plurality of a succession of pairs of symbols and a device for sending an OFDM signal from a transmitter entity connected to the management entity of this third implementation of the invention.

FIG. 7 shows only the means of the management entity and a transmitter entity for performing the invention. The management entity is for example a base station controller of a mobile radio telecommunications network.

The management entity includes:
means ORTHO for generating pairs of symbols orthogonal to a pair of symbols to be sent;
means DUPLIC for generating duplicated pairs of symbols from a pair of symbols to be sent;
means COLLECT for collecting a set of quality indices of the propagation channels between the transmitter entities and the receiver;
means SELECT-EG for selecting the allocated (current) pairs of symbols to be sent, orthogonal and duplicated pairs of symbols delivered by the generator means ORTHO and DUPLIC, respectively;
means ALLOUE-S for allocating pairs of symbols to be sent, orthogonal and duplicated pairs of symbols to the transmitter entities.

The transmitter entity includes:
means REC-EE for receiving a succession of pairs of symbols from the management entity;
means EMET for transmitting an OFDM signal on a plurality of sub-carriers equal to twice the number of remote transmitter entities, starting from the succession of pairs received by the means REC-EE.

Figure 8:
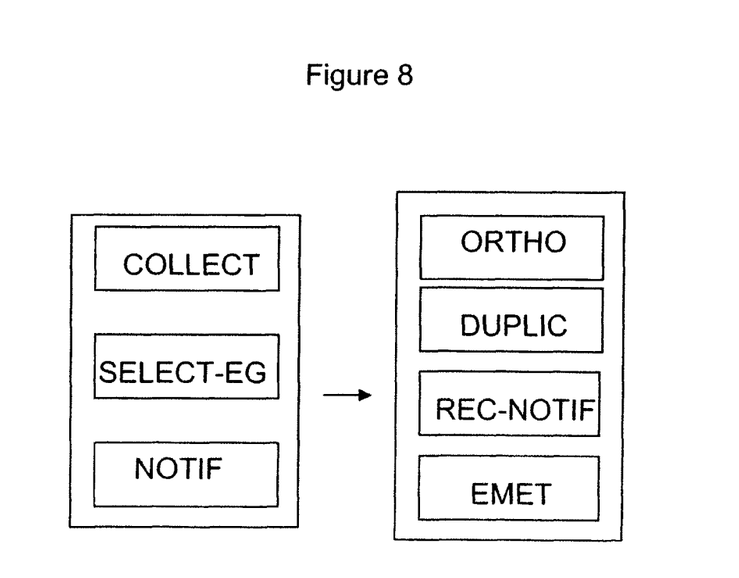
FIG. 8 shows diagrammatically a device of a management entity for selecting an allocation of pairs of symbols and a device for sending an OFDM signal from a transmitter entity connected to the management entity in a fourth implementation of the invention.

In a fourth implementation of the invention, the steps of the method are performed by a management entity of the telecommunications network and the transmitter entities connected to the management entity. The management entity is for example a base station controller of a mobile radio telecommunications network. In this implementation of the invention, a management entity includes means for notifying selective allocation of pairs of symbols to be sent, orthogonal pairs of symbols and duplicated pairs of symbols, the selection being determined on the basis of a collection of quality indices of propagation channels between the transmitter entities and the receiver. A transmitter entity includes means for generating a succession of pairs of symbols to be sent, duplicated pairs of symbols and orthogonal pairs of symbols according to a selection notification received and means for transmitting an OFDM signal.

FIG. 8 is a diagrammatic view of a device of an entity for managing selection of at least one allocated pair of symbols to be sent, an orthogonal pair of symbols and a duplicated pair of symbols and a device for sending an OFDM signal of a transmitter entity connected to the management entity of this fourth implementation of the invention.

FIG. 8 shows only the means of the management entity and a transmitter entity for performing the invention. The management entity is for example a base station controller of a mobile radio telecommunications network.

The management entity includes:
means COLLECT for collecting a set of quality indices of the propagation channels between the plurality of transmitter entities and the receiver;
means SELECT-EG for selecting at least one allocated pair of symbols to be sent and at least one orthogonal pair of symbols and a duplicated pair of symbols, starting from the pair of symbols to be sent;
means NOTIF for notifying the selection to the plurality of transmitter entities.

The transmitter entity includes:
means ORTHO for generating at least one pair of symbols orthogonal to a pair of symbols to be sent;
means DUPLIC for generating at least one duplicated pair of symbols from a pair of symbols to be sent;
means REC-NOTIF for receiving a notification of selection of the pairs of symbols to be sent, orthogonal pairs of symbols or duplicated pairs of symbols transmitted by the management entity;
means EMET for transmitting an OFDM signal on a plurality of sub-carriers equal to twice the number of transmitter entities, starting from a selected succession of pairs as notified in the notification received by the receiver means REC-NOTIF.

The invention described also relates to devices for sending a data signal comprising a series of symbols. Consequently, the invention also provides a computer program, notably a computer program on or in an information storage medium, adapted to perform the invention. These programs may use any programming language and take the form of source code, object code, or a code intermediate between source code and object code, such as a partially-compiled form, or any other desirable form, for performing the steps of the method of the invention.

The invention claimed is:

1. A method of sending a data signal comprising a series of symbols called current to a receiver, said method comprising the generation of number (NE) of orthogonal frequency division multiplex signals i.e. Orthogonal frequency-division multiplexing (OFDM) signals each formed of $N_f$ sub carriers, the NE OFDM signals respectively being simultaneously transmitted by NE transmitter entities, NE>1, for each succession of Nf current symbols the method comprises the steps of:

generating NE succession of $N_f/2$ pairs of symbols from the $N_f$ current symbols, comprising for each current pair of said succession of $N_f/2$ pairs of symbols the substeps of:

collecting a set of quality indicators of propagation channels between the transmitter entities and said receiver;

generating $N_{ortho} \geq 1$ pairs of symbols orthogonal $[y_{2k}, y_{2k+1}]$ to the current pair $[s_{2k}, s_{2k+1}]$ of symbols;

generating $N_{duplic} \geq 1$ replica by duplicating the current pair of symbols; and allocating said current pair of symbols, said $N_{ortho}$ orthogonal pair of symbols and said $N_{duplic}$ replica to respectively the NE transmitter entities, and selecting the allocation of the $N_{ortho}$ orthogonal pairs of symbols to the transmitter entities whose quality indicators are maximum or minimum; and generating said NE OFDM signals from respectively the NE succession of $N_f/2$ pairs of symbols wherein $N_{ortho} + N_{duplic} + 1 = NE$.

2. The sending method according to claim 1, wherein said $N_{ortho} \geq 1$ orthogonal pair of symbols is generated by applying space-time coding to the current pair of symbols.

3. A management entity for sending a data signal comprising a series of symbols to a receiver, said series of symbols being intended to be transmitted in the form of NE OFDM signals respectively transmitted by NE transmitter entities connected to said management entity, NE>1 said management entity comprising:

means for collecting a set of quality indicators of propagation channels between said plurality of transmitter entities and said receiver;

means for generating at least one pair of symbols orthogonal to a pair of symbols to be sent;

means for generating at least one duplicated pair of symbols from a pair of symbols to be sent; and means for allocating said current pair of symbols, said $N_{ortho}$ orthogonal pair of symbols and said $N_{duplic}$ replica to respectively the NE transmitter entities, and means for selecting at least one pair of symbols to be sent, at least one orthogonal pair of symbols and at least one replica allocated to the plurality of transmitter entities according to said set of quality indicators; and means for notifying said selection to said plurality of transmitter entities.

4. A system comprising the management entity according to claim 3 connected to a plurality of transmitter entities for sending a data signal comprising a series of symbols to a receiver, said series of symbols being intended to be sent in the form of a plurality of OFDM signals respectively transmitted by the plurality of transmitter entities, at least one of the transmitter entities comprising:

means for generating at least one pair of symbols orthogonal to a pair of symbols to be sent;

means for generating at least one duplicated pair of symbols from a pair of symbols to be sent;

means for receiving a notification of selection of said pairs of symbols to be sent, orthogonal pairs of symbols and duplicated pairs of symbols; and means for transmitting an OFDM signal formed from a succession of said selected pairs on a plurality of sub-carriers.

5. A non-transitory computer-readable medium for a management entity having stored thereon computer-executable instructions for a method of sending a data signal comprising a series of symbols called current to a receiver, said method the generation of NE orthogonal frequency division multiplex signals, i.e., OFDM signals each formed of Nf sub carriers, the NE OFDM signals respectively being simultaneously transmitted by NE transmitter entities, NE>1, Nf=2×NE, for each succession of Nf current symbols the method comprising the steps of:

generating NE succession of $N_f/2$ pairs of symbols from the $N_f$ current symbols, comprising for each current pair of said succession of $N_f/2$ pairs of symbols the substeps of:

collecting a set of quality indicators of propagation channels between the transmitter entities and said receiver;

generating $N_{ortho} \geq 1$ pairs of symbols orthogonal $[y_{2k}, y_{2k+1}]$ to the current pair $[s_{2k}, s_{2k+1}]$ of symbols;

generating $N_{duplic} \geq 1$ replica by duplicating the current pair of symbols; and allocating said current pair of symbols, said $N_{ortho}$ orthogonal pair of symbols and said $N_{duplic}$ replica to respectively the NE transmitter entities, and selecting the allocation of the $N_{ortho}$ orthogonal pairs of symbols to the transmitter entities whose quality indicators are maximum or minimum; and generating said NE OFDM signals from respectively the NE succession of $N_f/2$ pairs of symbols wherein $N_{ortho} + N_{duplic} + 1 = NE$.

* * * * *